United States Patent

Battocchio

[11] Patent Number: 6,164,843
[45] Date of Patent: Dec. 26, 2000

[54] TRIPOD, PARTICULARLY FOR PHOTOGRAPHIC USES

[75] Inventor: Gilberto Battocchio, Bassano Del Grappa, Italy

[73] Assignee: Lino Manfrotto & Co., S.p.A., Vicenza, Italy

[21] Appl. No.: 09/190,008

[22] Filed: Nov. 12, 1998

[30] Foreign Application Priority Data

Apr. 23, 1998 [IT] Italy ................................. PD98A0096

[51] Int. Cl.$^7$ ............... G03B 17/00; A47F 5/00; F16M 11/00; A47G 1/10
[52] U.S. Cl. ............... 396/419; 248/122.1; 248/168; 248/316.2; 248/176.3; 248/177.1; 248/286.1; D16/244; D16/5; D16/45; D16/130
[58] Field of Search ........................ 396/428; 354/293, 354/81, 288; D16/244, 5; 248/168, 178.1, 279, 178, 278, 280.1, 184, 122.1, 316.2; 352/243; 95/86; 403/218, 3; 46/16

[56] References Cited

U.S. PATENT DOCUMENTS

| | | | |
|---|---|---|---|
| D. 257,261 | 10/1980 | Shinohara | D16/4 |
| D. 335,298 | 5/1993 | Hanke | D16/224 |
| 4,283,152 | 8/1981 | Smith et al. | 403/3 |
| 5,632,459 | 5/1997 | Brett | 248/122.1 |
| 5,839,712 | 11/1998 | Wang | 248/316.2 |

*Primary Examiner*—Alan A. Mathews
*Assistant Examiner*—R. Bindingnavele
*Attorney, Agent, or Firm*—Sughrue, Mion, Zinn, Macpeak & Seas, PLLC

[57] ABSTRACT

The tripod includes a spider for the articulation of the legs and a support mounted in the spider with a first seat coaxial with the principal axis of the tripod and a second seat with an axis substantially perpendicular to the first seat so that a column of the tripod can be housed alternatively and removably either in the first seat or in the second seat.

7 Claims, 4 Drawing Sheets

TRIPOD, PARTICULARLY FOR PHOTOGRAPHIC USES

BACKGROUND OF THE INVENTION

The present invention relates to an improved tripod, particularly but not exclusively designed for optical or photographic uses, of the type comprising the characteristics of the preamble to the main claim. The term tripod is used in this context to indicate a support with three or more legs, no limitation being implicitly or explicitly attributable to the terminology adopted with regard to the number of legs.

It is well known that photographic tripods or stands are used for supporting photographic equipment in a firm and stable manner at a predetermined distance and height relative to the subject to be photographed or filmed.

A conventional tripod has a column, the position of which is adjustable along a vertical axis (coinciding with the principal axis of the spider) in order correspondingly to vary the position of the photographic equipment. There are, however, certain positions which are not permitted by known tripods or at least which cannot easily be achieved.

For example, for close-range photography or macro-photography, it is necessary to be very close to the subject to be photographed but, in some cases, the legs of the tripod may interfere with correct positioning. This is due to the fact that, in order to bring the photographic equipment close to the subject to be photographed or filmed, it is necessary to invert the position of the column so that the photographic equipment is disposed between the legs of the tripod a short distance from the ground, but photography is possible only within the area described between the tripod legs and not in the region outside this area.

The technical problem upon which the present invention is based is that of providing a tripod designed structurally and functionally to overcome all of the disadvantages complained of with reference to the prior art mentioned.

SUMMARY OF THE INVENTION

This problem is solved by the invention by means of a tripod comprising a spider having a principal axis, at least three legs converging in the spider and articulated thereto, a support in the spider with a first seat coaxial with the principal axis and a column mounted in the first seat coaxially with the principal axis, characterized in that the support comprises a second seat with an axis perpendicular to the first seat, the column being housed alternatively and removably either in the first seat or in the second seat.

BRIEF DESCRIPTION OF THE DRAWINGS

The characteristics and advantages of the invention will become clearer from the detailed description of a preferred embodiment thereof described below by way of non-limiting example, with reference to the appended drawings, in which.

DETAILED DESCRIPTION OF THE INVENTION

Figure 1:
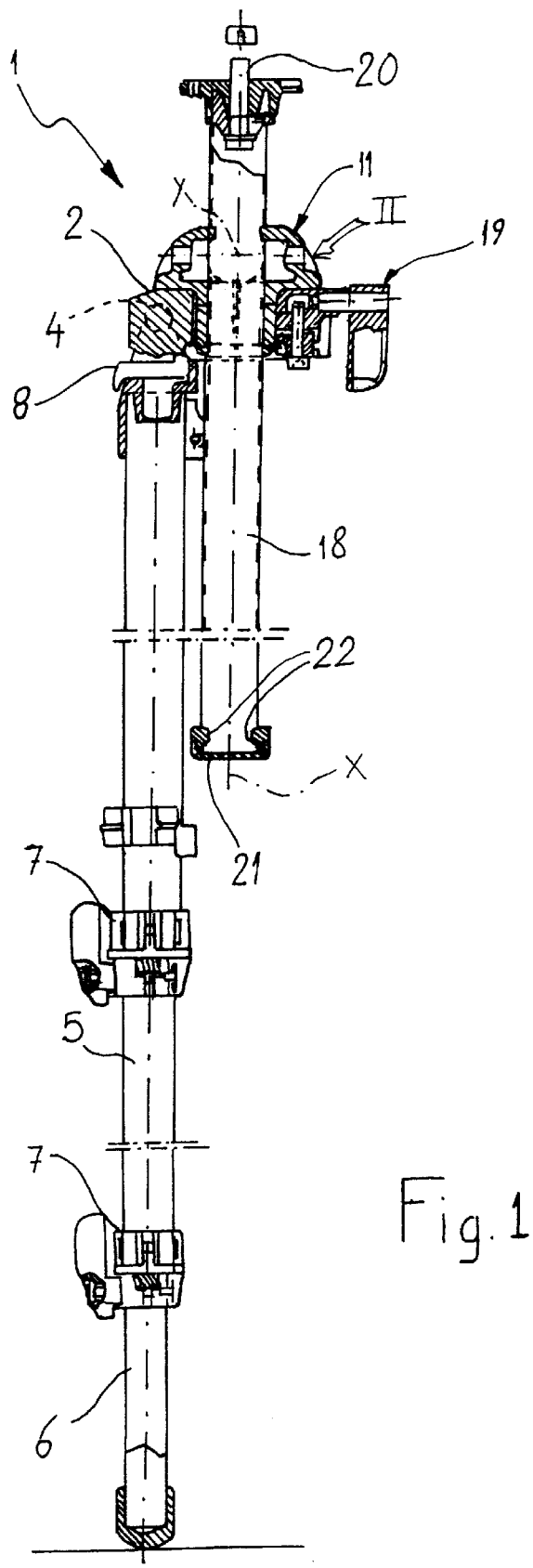
FIG. 1 is a partially-sectioned, schematic, side elevational view of a tripod formed in accordance with the present invention.
Figure 2:
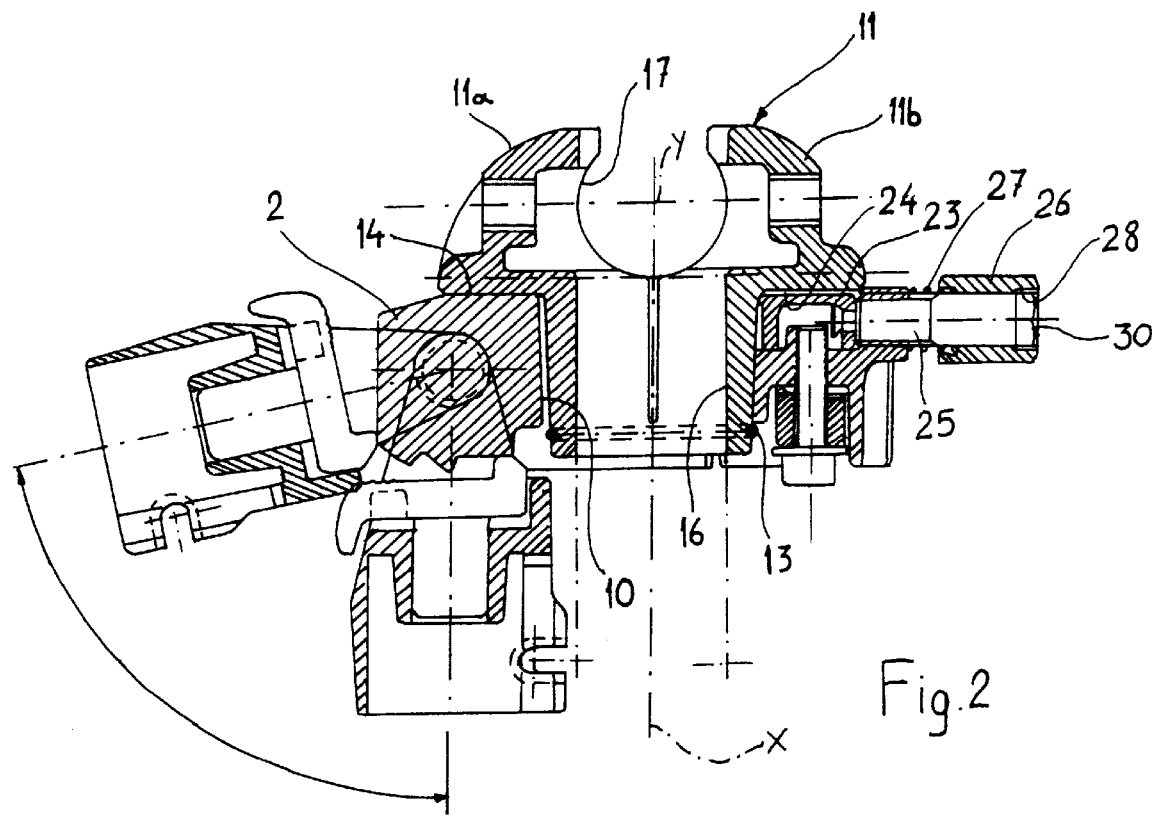
FIG. 2 is a section of the detail indicated by the arrow II in FIG. 1, on an enlarged scale.
Figure 3:
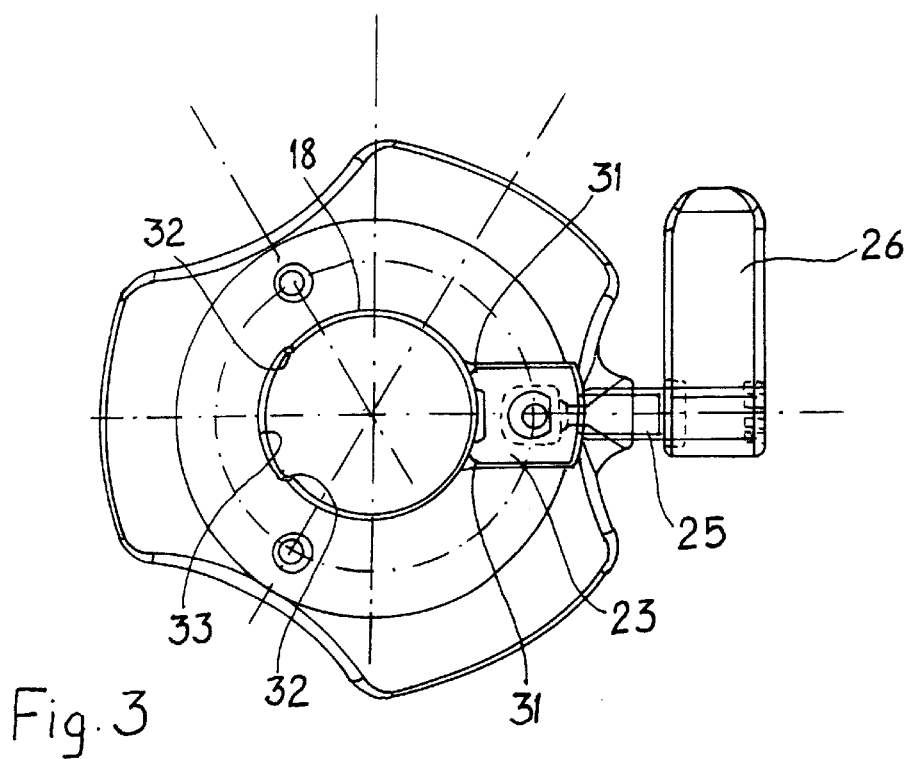
FIG. 3 is a plan view of the spider of the tripod of FIG. 1, FIGS. 4 and 5 are perspective views of a detail of the jaws of the tripod of the invention, from one side and from the other side.
Figure 4:
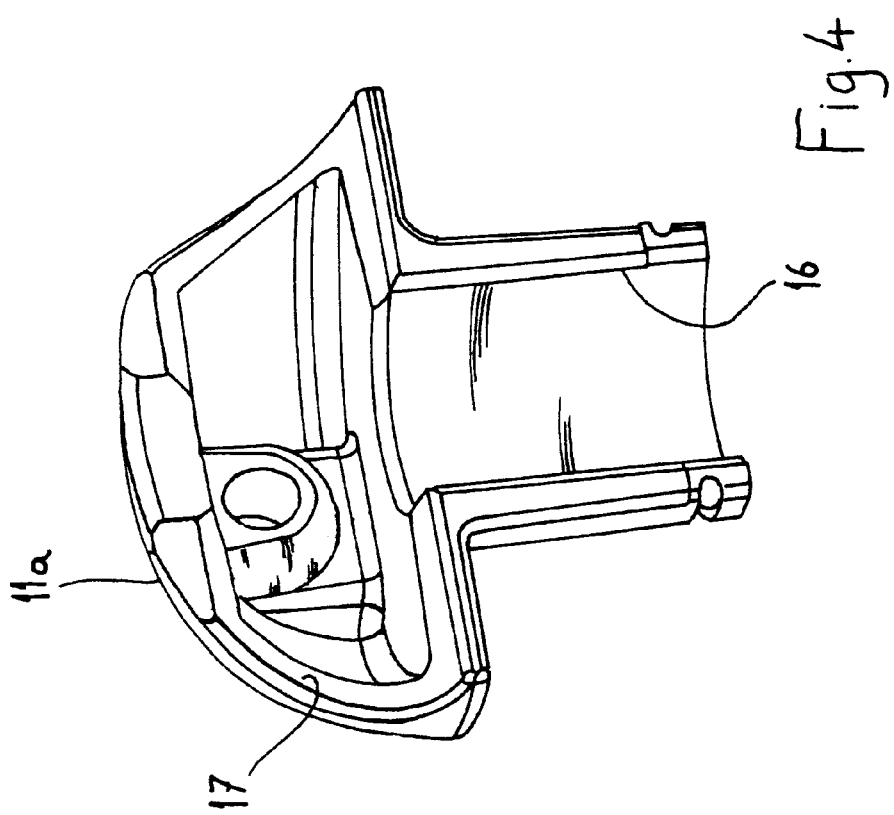
Figure 5:
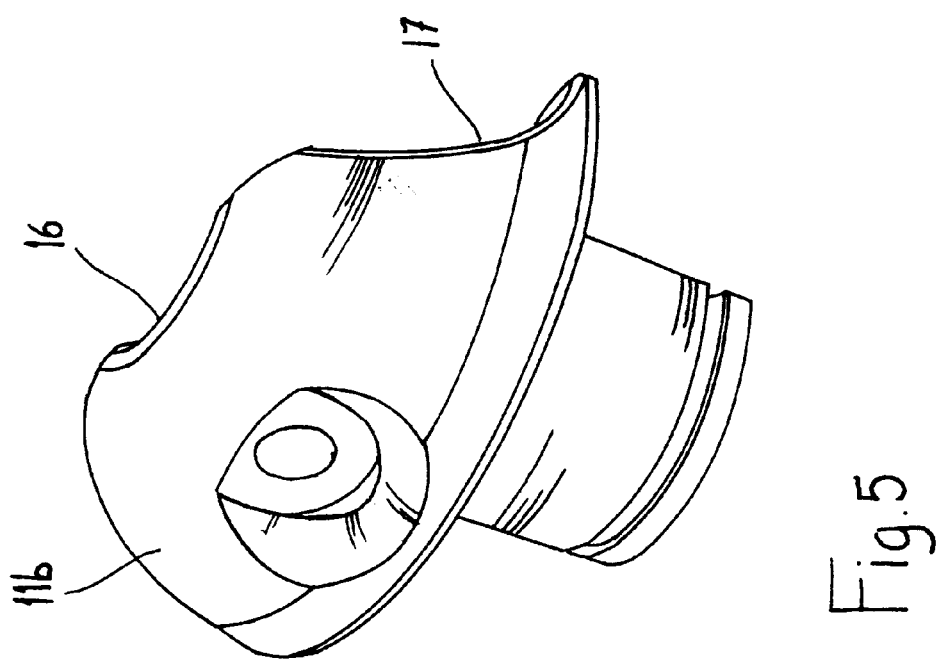
Figure 7:
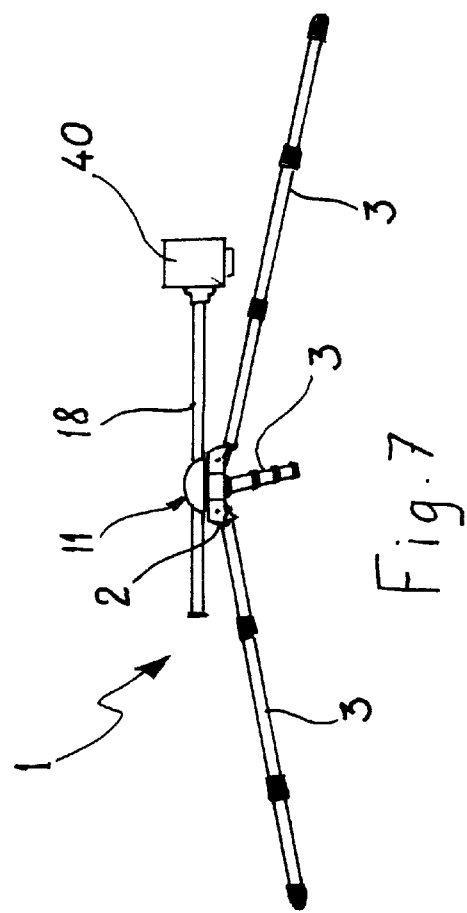
FIGS. 6 and 7 show the tripod of the previous drawings, in two possible positions.
Figure 6:
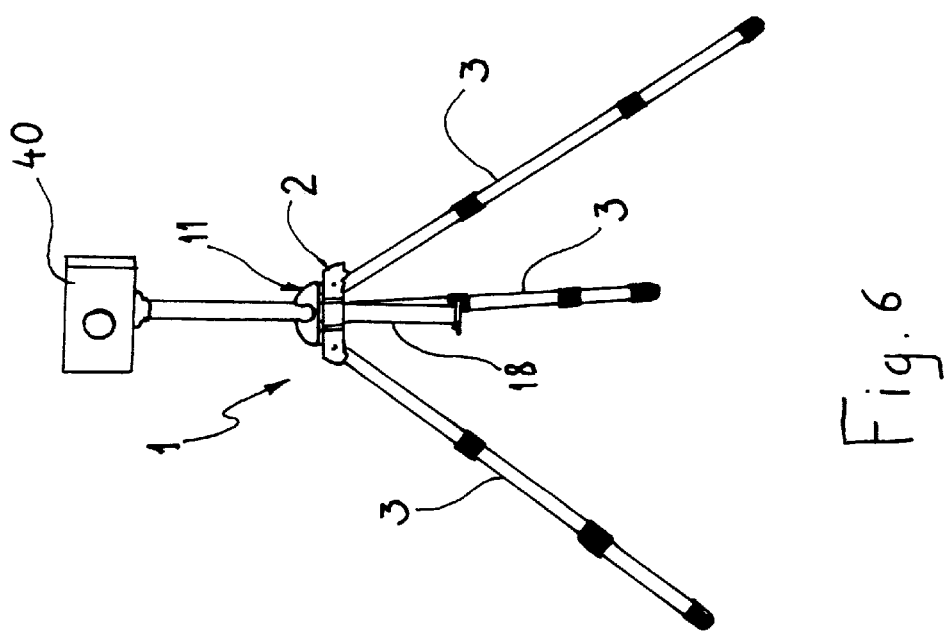

In FIG. 1, a tripod formed in accordance with the present invention is generally indicated 1 and includes a spider 2 which has a principal axis X and in which three legs, all indicated 3 converge and are articulated on respective pins 4. For clarity, only one of the three legs is shown in detail in FIG. 1.

Each leg 3 is formed, in known manner, with a telescopic structure with two or more extensions 5, 6 the relative positioning of which is adjustable by means of clamps 7. The angular position of each leg 3 about the pin 4 is also adjustable by means of an adjustment device 8.

In the centre of the spider 2, there is a hole 10 with an approximately cylindrical surface extending coaxially with the axis X. The hole 10 houses a support 11 having a generally clamp-like configuration with two (or more) symmetrical and opposed jaws 11a, 11b.

The jaws 11a, 11b are restrained axially in the hole 10 in the spider 2 by means of a Sieger ring 13 on one side and a shoulder 14 on the opposite side. A shim ring of anti-wear material (not shown) is preferably interposed between the shoulder 14 and the surface of the spider 2 facing the shoulder.

A first and a second seat 16, 17 are defined in the jaws 11a, 11b. The first seat 16 is coaxial with the principal axis of the spider X and the second seat 17 extends transversely and has an axis Y perpendicular to the axis X.

A column 18 can be housed alternatively and removably either in the first seat 16 or in the second seat 17, and is held therein by the tightening of the jaws 11a, 11b onto the column by clamping means 19.

Of each seat 16, 17, half is formed in one of the jaws 11a, 11b and half is formed in the other jaw, the half seats being shaped as portions of cylindrical surfaces.

The column 18 is tubular and carries at one of its axial ends an attachment 20, for example, a screw attachment for the fixing thereto of photographic or other user equipment and, at the axially opposite end, an elastomeric cap 21 press-fitted and restrained by appendages 22 which engage in corresponding holes in the column. The cap 21 has the main function of preventing the column from accidentally coming out of the seat 16, 17 in which it is engaged but the cap is removed in order to transfer the column 18 from one of the seats to the other.

The support 11 is mounted in the spider 2 so as to be rotatable about the principal axis X when the clamping means 19 are slackened. The clamping means also serve for locking the rotation of the support and of the column held therein.

The aforementioned clamping means comprise a block 23 which can be slid to a limited extent in a recess 24 of the spider 2 by means of a screw 25 with a take-un crank 26, that is, a crank urged by a spring 27 to engage a key 30 of the screw 25 in a polygonal seat 28 of the crank. The block 23 is guided in a substantially radial direction relative to the column and, on the opposite side to the screw 25, has two projections 31 for defining two circumferentially-spaced points of contact with the jaws 11a, 11b of the support. Diametrally opposite the block 23, the hole 10 as an axial groove 33 the edges of which define a further two contact points 32 for the jaws opposite the block 23 so that, for any annular position of the jaws about the principal axis X, a load directed radially towards the column 18 is produced between the jaws of the spider as a result of the radial clamping of the block against at least one of the jaws.

By virtue of the structure just described, the tripod 1 can support photographic equipment 40 mounted on the attachment 20 either with the column 18 housed in the first seat 16 of the support 11 or with the column 18 mounted at right angles to the previous position in the seat 17. In this position, it is possible, for example, to achieve positions of the photographic equipment very close to the subject without the tripod legs interfering with the immediately surrounding area.

In order to move the column from one of the two positions to the other, it suffices to remove the cap 21, to slacken the clamping means 19, to take the column out of one seat, and to insert it in the other. When this has been done, the means 19 are re-tightened and the cap is replaced on the end of the column 18.

What is claimed is:

1. An improved tripod comprising a spider having a principal axis, at least three legs converging in the spider and articulated thereto, a support in the spider with a first seat coaxial with the principal axis, and a column mounted in the first seat coaxially with the principal axis, characterized in that the support comprises a second seat with an axis perpendicular to the first seat, the column being housed alternatively and removably either in the first seat or in the second seat.

2. A tripod according to claim 1, in which the support has a clamping configuration with at least two jaws restrained axially in the spider, and clamping means are provided between the spider and the support for clamping the jaws onto the column.

3. A tripod according to claim 2, in which half of each seat is formed in one of the jaws and half of each seat is formed in the other jaw.

4. A tripod according to claim 2 in which the support is mounted for rotating about the principal axis in the spider.

5. A tripod according to claim 4, in which locking means are interposed between the support and the spider for locking the rotation of the support about the principal axis.

6. A tripod according to claim 4, in which the locking means for locking the rotation of the support are incorporated in the clamping means for clamping the jaws.

7. A tripod according to claim 6, in which the clamping means comprise a block movable in the spider in a radial direction and having two circumferentially-spaced points of contact with the jaws of the support, the spider defining, on the side diametrically opposite the block, a further two contact points for the jaws, opposite of the block, so that, for any angular position of the jaws about the principal axis, a radial load is produced between the jaws of the spider as a result of the radial tightening of the block against at least one of the jaws.

* * * * *